United States Patent [19]

Berger et al.

[11] Patent Number: 5,780,781
[45] Date of Patent: Jul. 14, 1998

[54] DEVICE FOR WEIGHING A PERSON CONFINED TO BED

[75] Inventors: Antoine Berger, Pommerol; Serge Esteveny, Saint Just Saint Rambert, both of France

[73] Assignee: Centre Stephanois de Recherches Mecaniques Hydromecanique et Frottement S.A., France

[21] Appl. No.: 403,740

[22] PCT Filed: Jan. 27, 1994

[86] PCT No.: PCT/FR94/00099

§ 371 Date: Oct. 10, 1995

§ 102(e) Date: Oct. 10, 1995

[87] PCT Pub. No.: WO94/17376

PCT Pub. Date: Aug. 4, 1994

[30] Foreign Application Priority Data

Jan. 28, 1993 [FR] France .................... 93-01252

[51] Int. Cl.$^6$ .............. G01G 21/00; G01G 19/52; G01G 21/28; G01G 21/22
[52] U.S. Cl. .............. 177/126; 177/126; 177/144; 177/238; 177/253
[58] Field of Search ................... 177/262, 144, 177/126, 238, 253

[56] References Cited

U.S. PATENT DOCUMENTS 4,363,368 12/1982 Paddon et al. .................. 177/144
4,934,468 6/1990 Koerber, Sr. et al. ............ 177/144

Primary Examiner—Cassandra C. Spyrou
Assistant Examiner—Anh Mai
Attorney, Agent, or Firm—Wall Marjama & Bilinski

[57] ABSTRACT

Apparatus for weighing a person that is confined to a bed that includes a series of modular units for supporting a bed frame and sensors associated with each of the modular units that are capable of performing in combination a weighing function.

17 Claims, 4 Drawing Sheets

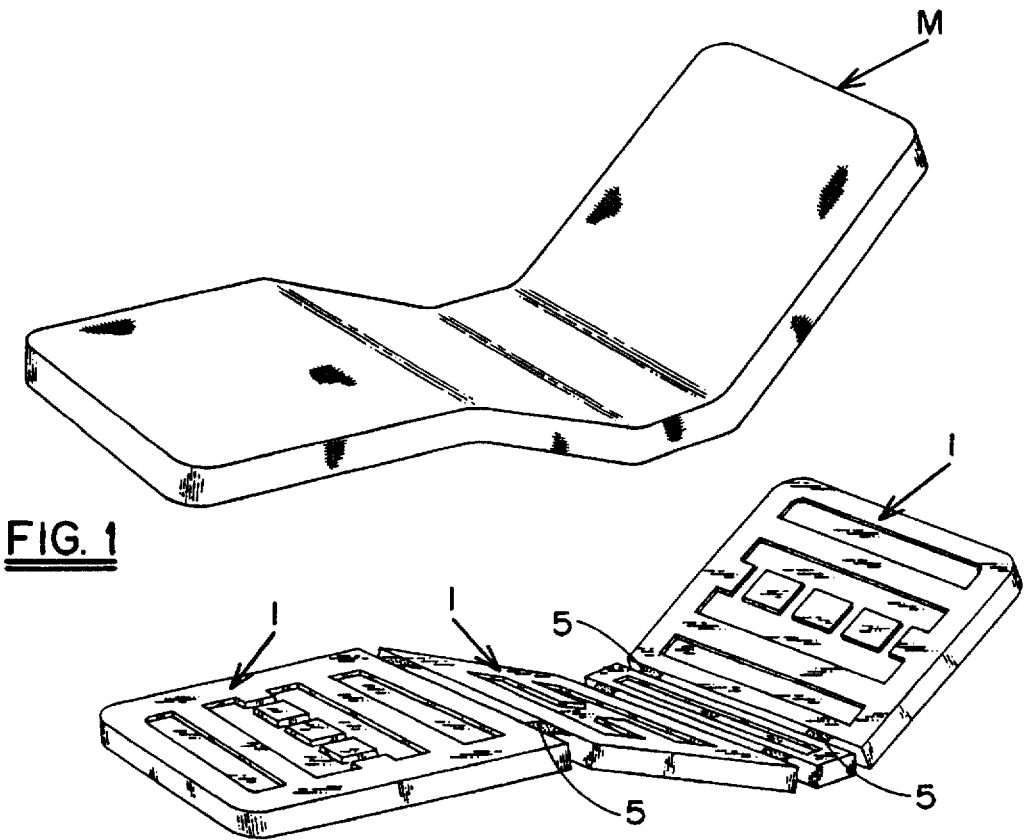
FIG. 1
FIG. 1a
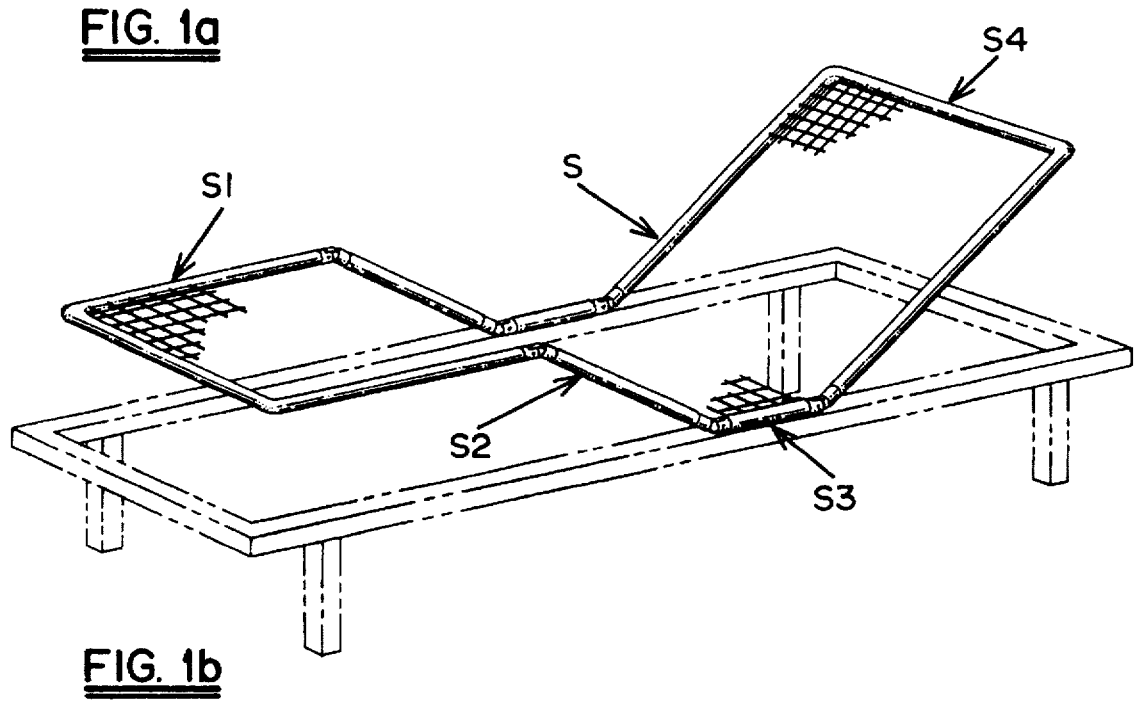
FIG. 1b

DEVICE FOR WEIGHING A PERSON CONFINED TO BED

BACKGROUND OF THE INVENTION

The invention concerns, in particular, the weighing of persons who are in intensive care and, more generally, weighing persons who cannot get out of bed and/or move around.

When treating certain illnesses, it is necessary to monitor changes in the patient's weight by taking daily notes. Given the condition of the patient, i.e. the fact that he/she is confined to bed, various solutions are currently employed.

The most widely employed solution is to lift the patient from the bed by suspending him/her from a hoist harness by means of a system of slings linked to sensors. It is clear that this solution is difficult to implement and may pose a certain risk to the patient.

In addition, the time needed to weigh the patient is considerable given the many manipulations that have to be performed.

Another solution is to place a system under the feet of the bed that makes it possible to weigh the bed as well as the patient. Once again this solution is not satisfactory because the weighing system cannot be permanently installed. Similarly and most importantly, there is considerable risk of measuring errors given the fact that various accessories may be added compared with the initial weighing, thus altering the tare weight.

Beds are known which incorporate sensors. Although the results obtained are satisfactory, the design of this type of bed involves very complicated technology and they are expensive compared with the beds that are usually used. In fact, these beds incorporate other items that are not necessarily used depending on the pathological case to be treated.

SUMMARY OF THE INVENTION

The purpose of the invention is to overcome these disadvantages in a simple, safe, effective and rational manner.

The problem of weighing is made more awkward because beds have a bed frame that is generally articulated in at least three parts. The weighing operation must be carried out with the patient in a horizontal or substantially horizontal position. It is apparent that it is obviously not possible to eliminate the articulation of the bed frame.

The problem that the invention intends to solve is to allow the weighing of a person confined to bed with the objective of, on the one hand, not lifting the patient from the bed and, on the other hand, of being able to articulate the bed frame of the bed at will.

In order to solve such a problem, a weighing device has been designed and developed that comprises several modules that are linked so that they are articulated in order to very closely match the geometrical shape of an articulated bed frame, each module being fitted with at least one sensor capable of performing, in combination, the weighing function.

Another problem that the invention intends to solve is to correct the torque force caused by the misalignment of the applied force with the sensor in order to obtain the most accurate possible weighing.

Such a problem is solved by fitting each module with several sensors, each sensor being rigidly fixed on a mounting that is itself fixed to the corresponding module with the capacity of micro displacement and micro rotation.

This capacity for micro displacement and micro rotation makes it possible to create free support conditions in order to subject the sensors only to vertical forces produced by weight and eliminate the effect of internal forces caused by deformation of connecting elements such as flexing under load, expansion, etc.

In order to solve the stated problem of weighing, each module consists of two independent nestable shells, one that rests on the bed frame and the other which accommodates the mattress with the mountings of the sensors being fixed between the two shells.

Each sensor mounting consists of two independent parts that are rigidly fixed either side of the sensor, each of these parts being connected to the corresponding shell of the module in question with the capacity for micro displacement and micro rotation.

In situations where this device is used, it is often beneficial for the largest possible surface area to be transparent to X-rays or other radiation, i.e. for such a surface to be free from any metal part.

For this purpose, in order to make the entire surface of the modules free from metal parts, each module comprises two sensors arranged longitudinally close to its lateral edges and the top and bottom shells are made of plastic.

In order to solve the stated problem of ensuring that the modules are linked and articulated whilst nevertheless making it possible to transmit measurement signals, the modules are linked by flexible straps.

Given the application of the device to a bed equipped with an articulated bed frame, the latter comprises one module corresponding to the head of the bed frame, one module corresponding to the foot of the bed frame and one or more modules corresponding to the part or parts that link the head and the foot of the bed frame.

In order to solve the stated problem of obtaining fixing of the shells in relation to the sensors in a flexible manner with the capacity for micro displacement and micro rotation, the component parts of each sensor mounting are fixed on the shells by means of a joint consisting of a viscoelastic material of low rigidity. This material can be rubber or plastic foam. In this case, joining can be advantageously obtained by using double-sided adhesive tape.

BRIEF DESCRIPTION OF THE DRAWINGS

The invention is explained below in more detail, reference being made to the accompanying drawings in which:

FIG. 1 is a perspective view showing the device before assembly on an articulated bed frame.

DESCRIPTION OF THE INVENTION

Figure 2:
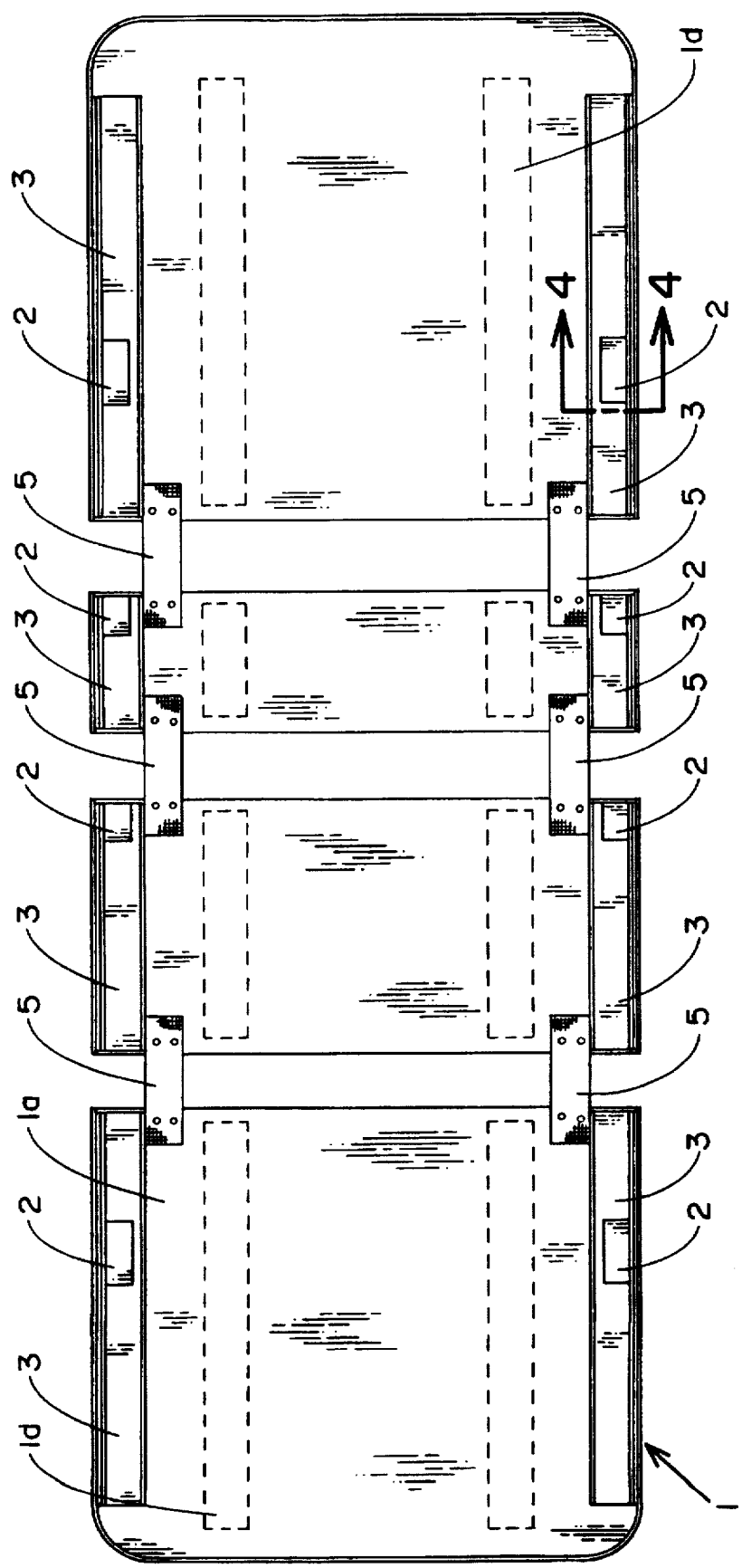
FIG. 2 is a plan view of the device showing the bottom shells the modules.
Figure 3:
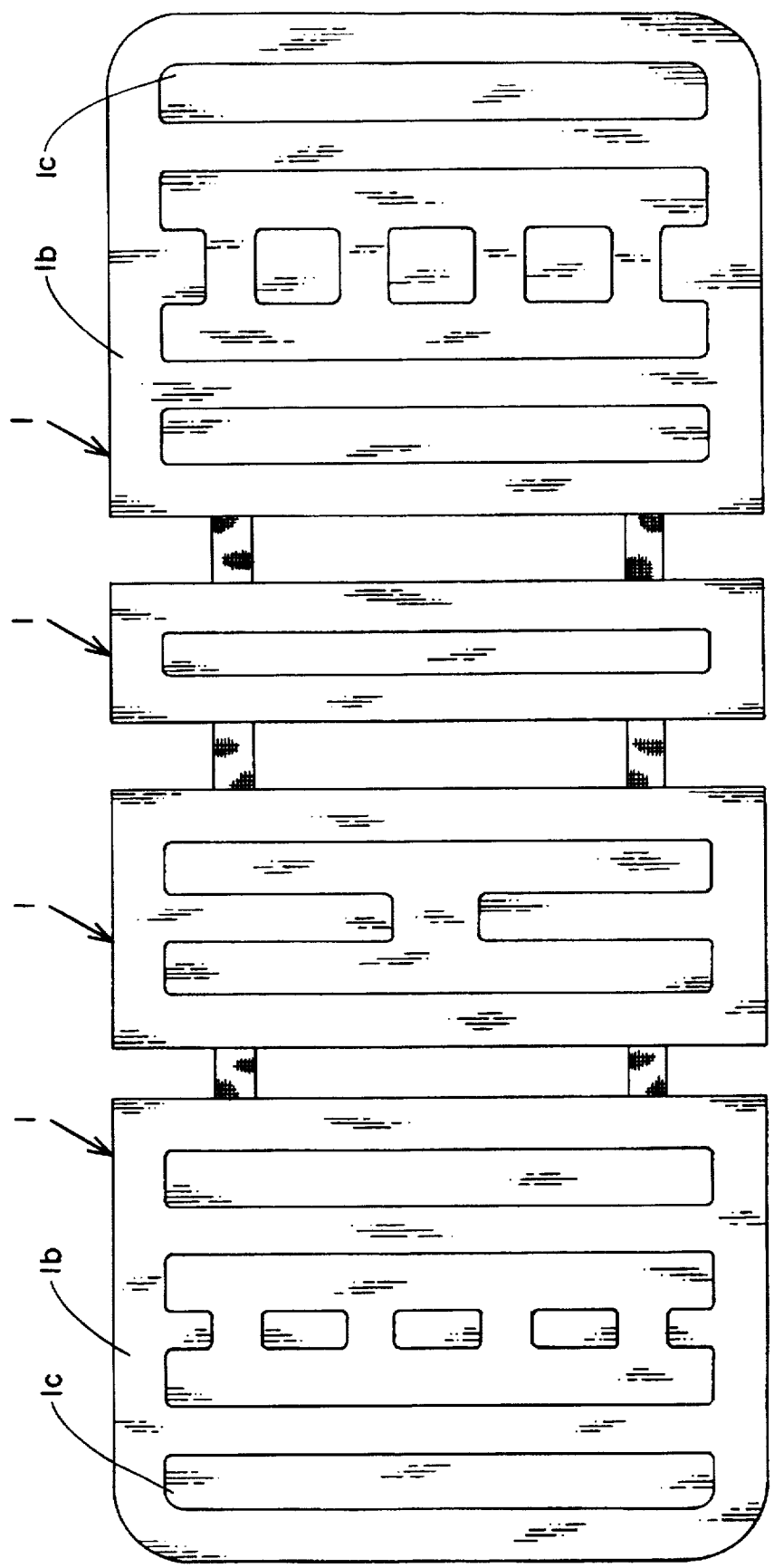
FIG. 3 is a top view of the device.
Figure 4:
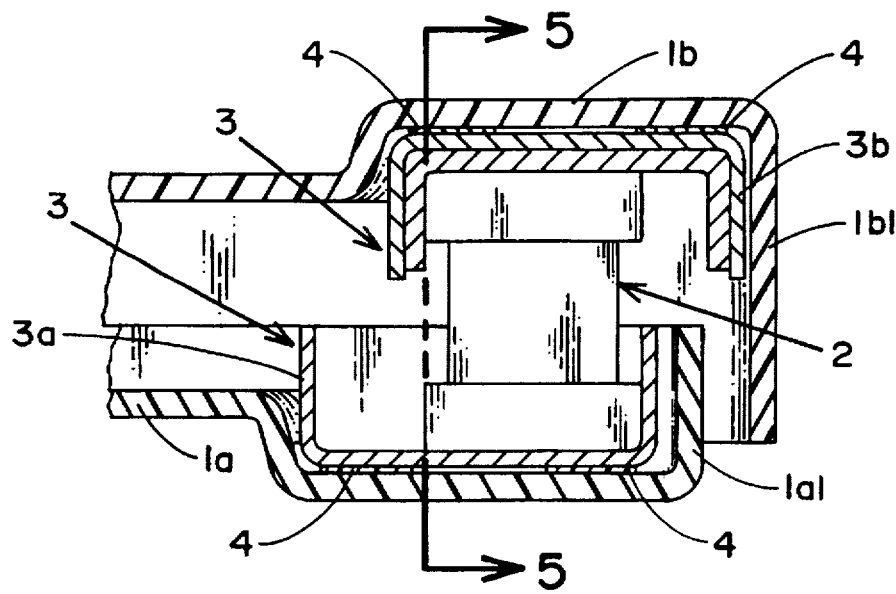
FIG. 4 is a cross-sectional view along line 4.4 in FIG. 2.
Figure 5:
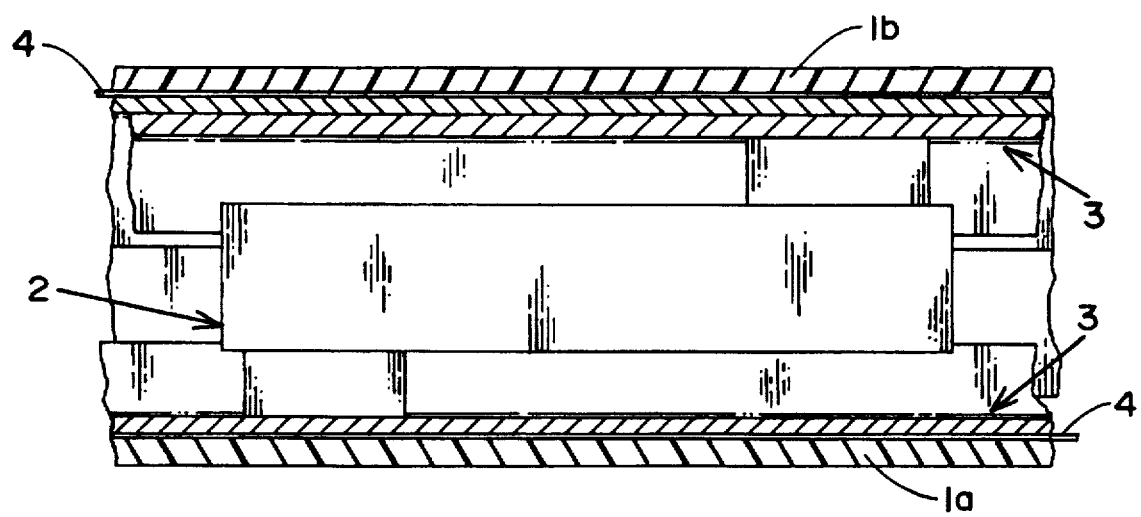
FIG. 5 is a longitudinal sectional view along line 5.5 in FIG. 4.

The weighing device is applicable to any type of bed equipped with an articulated bed frame denoted in its entirety by (S). This bed frame (S) may, for example, consist of four articulated parts (S1) (S2) (S3) (S4) with parts (S1) and (S4) respectively constituting the head and the foot of the bed frame. A mattress (M) is placed on this bed frame. The weighing device according to the invention is placed directly on the bed frame (S) whereas the mattress (M) is placed directly on the weighing device.

The device comprises several modules (1) connected so that they are articulated in order to very closely match the geometrical shape of the bed frame (S). Each module (1) is equipped with at least one sensor (2). In particular, each module (1) is made of two independent nestable shells (1a) (1b) forming a cover. The shells (1a) that constitute the base parts are intended to rest directly on the bed frame whereas shells (1b) are support parts and accommodate the mattress (M). Shells (1a) and (1b) are of a general quadrilateral shape in order to very closely match each of the component parts (S1) (S2) (S3) (S4) of the bed frame (S). Each shell (1a) and (1b) can be produced by moulding a plastic material and may be manufactured with stiffness ribs (1c) (1d). The dimensions of the top shell (1b) very slightly exceed those of the bottom shell (1a).

Each shell (1a) and (1b) has a peripheral edge rim (1a1) (1b1) so that, when they are nested, rim edge (1b1) overlaps rim edge (1a1). Note that the end modules which correspond respectively to the head and the foot of the bed frame are of essentially the same size whereas the intermediate modules are of smaller size.

Sensors (2) are fixed between the two shells (1a) and (1b) in order to carry out the weighing operation given the fact that the two shells are independent. For this purpose, each sensor (2) is rigidly fixed on a mounting (3) that is itself fixed to the corresponding module (1) with the capacity for micro displacement.

In the embodiment illustrated, each mounting (3) consists of two independent parts (3a) and (3b). These two parts are rigidly fixed either side of the sensor (2) by any known appropriate means such as screws. In contrast, each of the parts (3a) and (3b) is joined to the corresponding shell (1a) and (1b) in a flexible manner with the capacity for micro displacement and micro rotation. For instance, parts (3a) and (3b) are fixed by means of double-sided adhesive tape (4).

These mountings (3a) and (3b) consist of U-sections made of iron and are fixed as indicated along the inside lateral edges of each module (FIG. 2).

Given these provisions, the various modules (1) as described and equipped with sensors (2) are linked by flexible straps (5). These straps are arranged close to the lateral edges of the bottom shells (1a) and act as a hinge between two consecutive modules. Conductors providing electrical connection between the various sensors (2) can be attached to these flexible straps (5).

Figure 6:
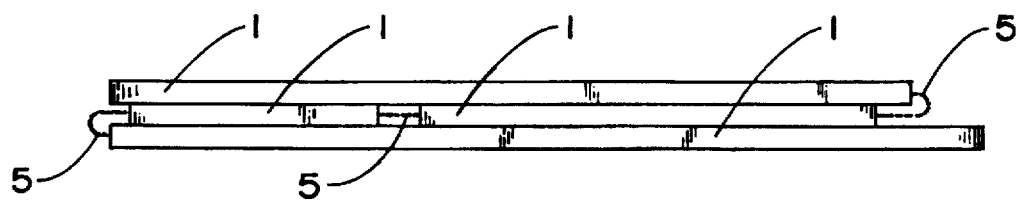
FIG. 6 shows possible folding of the device.

This articulation of the modules makes it possible to fold the entire device so that it takes up a very small space given the fact that the modules (1) can be placed on top of each other (FIG. 6).

In order to carry out a weighing operation, the bed frame (S) is arranged so that its various component parts (S1) (S2) (S3) (S4) are positioned in an substantially horizontal plane. The various modules (1) therefore occupy the same position in space as the bed frame (S). The patient's weight therefore rests entirely on all the modules and, more particularly, on top shells (1b) and is therefore applied to the various sensors (2). The latter are linked to any electronic control system or any other electronic system in order to furnish any information on the weighing carried out; this electronic system can be devised, for example, to indicate:

The patient's weight (with subtraction of tare weight: mattress —bed linen)

Changes in the patient's weight

The weight recorded by each of the modules and changes in that weight.

It is planned to equip some or all of the bottom shells (1a) with non-slip components such as rubber feet in order to keep the device resting on the bed frame.

The advantages are apparent from the description; particularly emphasis and stress is placed on the following points:

Ease of use.

Measuring accuracy obtained.

Ability to adapt the device to any type of articulated bed frame

Possibility of weighing the patient without lifting him/her from the bed.

We claim:

1. A device for weighing a person confined to an articulating bed that includes an articulating bed frame, comprising a plurality of discrete modules; each module including a covering having a top and a bottom exterior surface, and an at least one weight sensor (2), each weight sensor including a means for generating an electrical signal representative of a weight supported by said weight sensor; wherein said modules are articulately connected to each other, and wherein a shape of the articulately connected modules is congruent to a shape of said articulating bed frame.

2. The device of claim 1 wherein each module comprises a plurality of said weight sensors (2) rigidly attached to a mounting (3), wherein each mounting is attached to said covering by a mounting means for allowing micro displacement between each mounting and said covering and for allowing micro rotation between each mounting and said covering.

3. The device of claim 2 wherein said covering of each module includes two separate shells, a bottom shell (1a) and a top shell (1b), said bottom shell and said top shell are dimensioned so that said bottom shell nests within said top shell, said mounting (3) is attached to said bottom shell by said mounting means, and said mounting is attached to said top shell by said mounting means.

4. The device of claim 3 wherein said mounting (3) comprises an independent first mounting (3a) and an independent second mounting (3b), wherein said first mounting is rigidly attached to said sensor and attached to said bottom shell by said mounting means, and said second mounting is rigidly attached to said sensor and attached to said top shell by said mounting means.

5. The device of claim 1 wherein each module (1) has a lateral edge, wherein said sensors comprise two sensors (2), each sensor arranged longitudinally along said module near said lateral edge of each module.

6. The device of claim 1 further comprising a flexible material that connects said modules to each other.

7. The device of claim 6, wherein said flexible material includes a strap.

8. The device of claim 1 wherein said bottom exterior surface of each module (1) includes a non-slip means for said bottom exterior surface not slipping on said articulating bed frame when said bottom exterior surface is on said articulating bed frame.

9. The device of claim 1, wherein said articulating bed frame includes an articulating head section, an articulating foot section, and an at least one part that links said foot section to said head section, and said connected modules further comprise a first end module, a second end module, and at least one intermediate module; and said first end module matches the shape of said head section, said second end module matches the shape of said foot section, and said at least one intermediate module matches the shape of said at least one part.

10. The device of claim 4 wherein said mounting means comprises a pliant viscoelastic joint.

11. The device of claim 10 wherein said joint comprises a double-sided adhesive tape (4).

12. The device of claim 1 wherein said top shell comprises a molded plastic that includes a stiffener rib, and said bottom shell comprises a molded plastic that includes a stiffener rib.

13. The device of claim 1, further comprising an electrical processing means for electrically processing said electrical signals to indicate the total weight of a mass on the top exterior surface of said modules.

14. The device of claim 1, further comprising an electrical processing means in electrical communication with said electrical signals for electrically processing said electrical signals to indicate a mathematical difference in weight of a mass on the top exterior surface of said modules between one moment and at another predetermined previous moment.

15. The device of claim 1, further comprising an electrical processing means in electrical communication with said electrical signals for electrically processing said electrical signals to indicate the weight of a person on a mattress fitted for said bed frame, compensating for tare weight, when said bottom exterior surface rests on said bed frame and said mattress rests on said top exterior surface.

16. The device of claim 1, further comprising an electrical processing means in electrical communication with said electrical signals for electrically processing said electrical signals to indicate the weight of a mass on the top of each exterior surface of said modules.

17. The device of claim 1, further comprising an electrical processing means in electrical communication with said electrical signals for electrically processing said electrical signals to indicate the mathematical difference in weight of a mass on the top of each exterior surface of said modules at one moment and at another predetermined previous moment.

\* \* \* \* \*